(12) United States Patent
Dutta et al.

(10) Patent No.: US 7,840,669 B2
(45) Date of Patent: Nov. 23, 2010

(54) PROVISIONING ARTIFACTS FOR POLICY ENFORCEMENT OF SERVICE-ORIENTED ARCHITECTURE (SOA) DEPLOYMENTS

(75) Inventors: Satadip Dutta, Cupertino, CA (US); Viji Kakkattu Ravindran, Bangalore Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 84 days.

(21) Appl. No.: 12/241,799

(22) Filed: Sep. 30, 2008

(65) Prior Publication Data

US 2010/0030890 A1 Feb. 4, 2010

Related U.S. Application Data

(60) Provisional application No. 61/086,091, filed on Aug. 4, 2008.

(51) Int. Cl.
*G06F 15/173* (2006.01)
(52) U.S. Cl. .......................... 709/224; 717/104; 726/1
(58) Field of Classification Search ................. 709/224; 717/104, 174, 178; 726/1, 6
See application file for complete search history.

(56) References Cited

U.S. PATENT DOCUMENTS

| | | | |
|---|---|---|---|
| 2005/0222931 A1* | 10/2005 | Mamou et al. ............... 705/35 |
| 2006/0235733 A1* | 10/2006 | Marks ........................... 705/7 |
| 2008/0126406 A1* | 5/2008 | Endabetla et al. ....... 707/103 R |
| 2008/0178169 A1* | 7/2008 | Grossner et al. ........... 717/170 |
| 2009/0106012 A1* | 4/2009 | Liu .............................. 703/21 |
| 2009/0157419 A1* | 6/2009 | Bursey ........................ 705/1 |

* cited by examiner

*Primary Examiner*—Frantz B Jean

(57) ABSTRACT

A system provisions artifacts for policy enforcement of service-oriented architecture (SOA) deployments. The system comprises a computer-executed program code that creates a model of a SOA deployment by collecting information about SOA artifacts and mapping between business-centric applications and underlying SOA artifacts. The system further comprises a computer-executed program code that converts the model into actionable artifacts which are provisioned to SOA policy enforcement points.

21 Claims, 14 Drawing Sheets

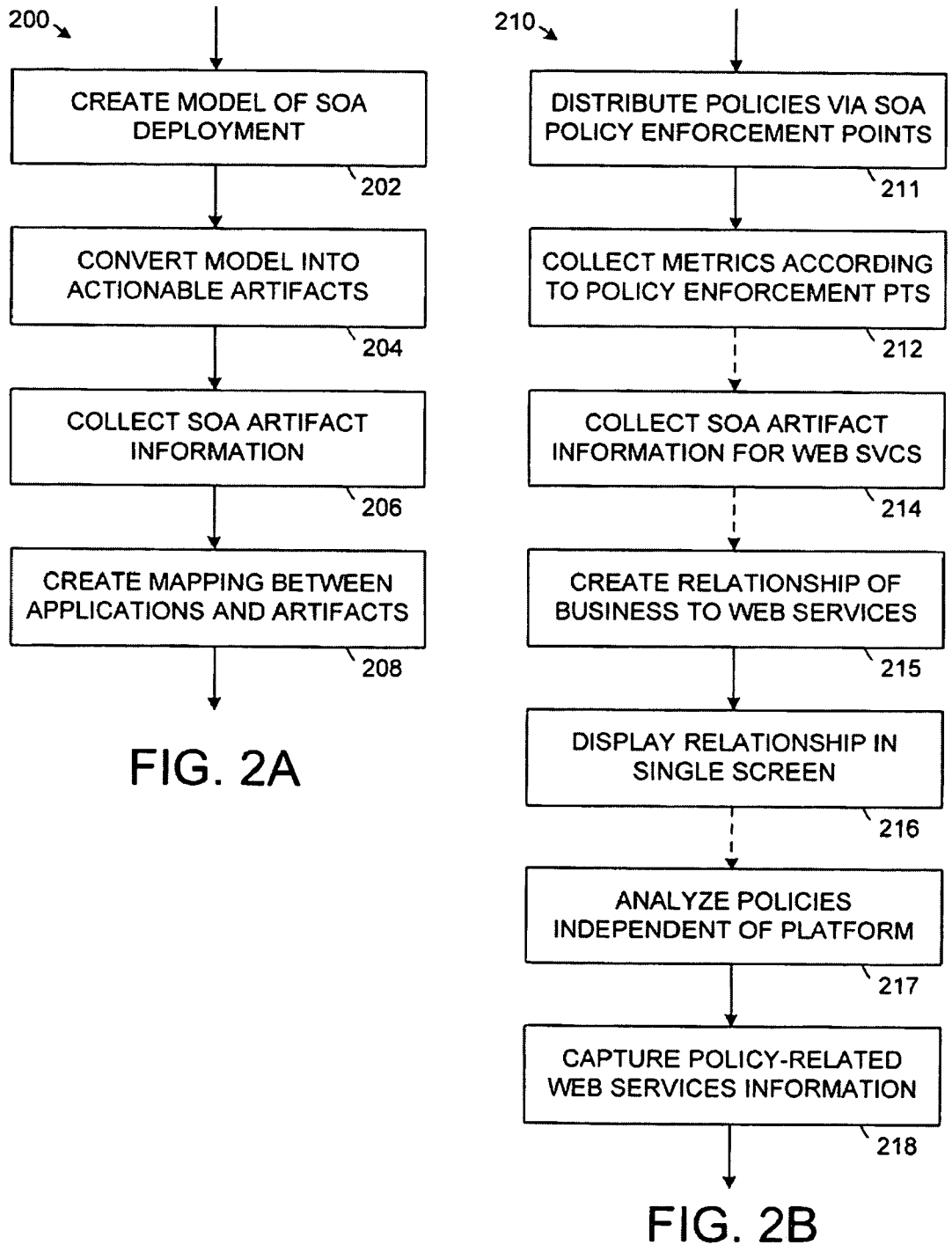

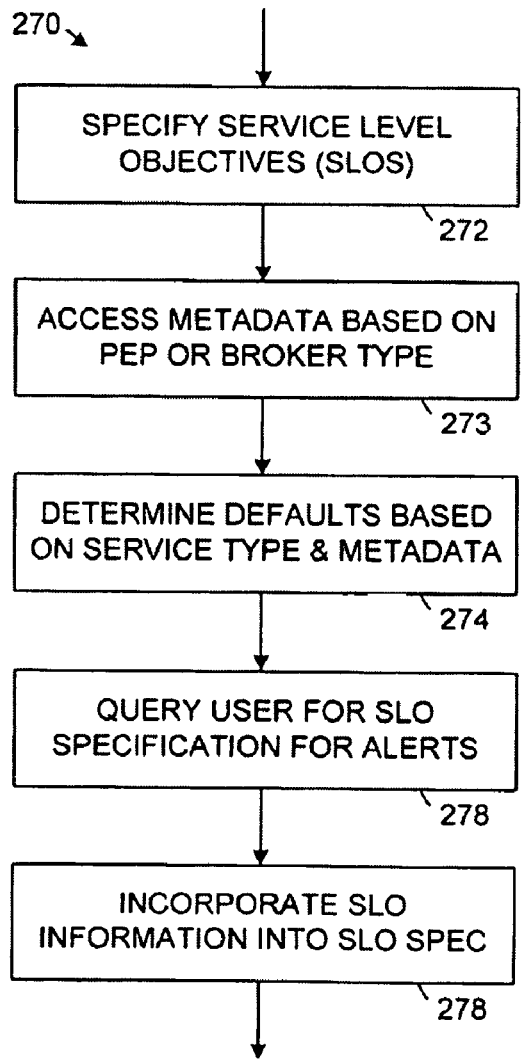
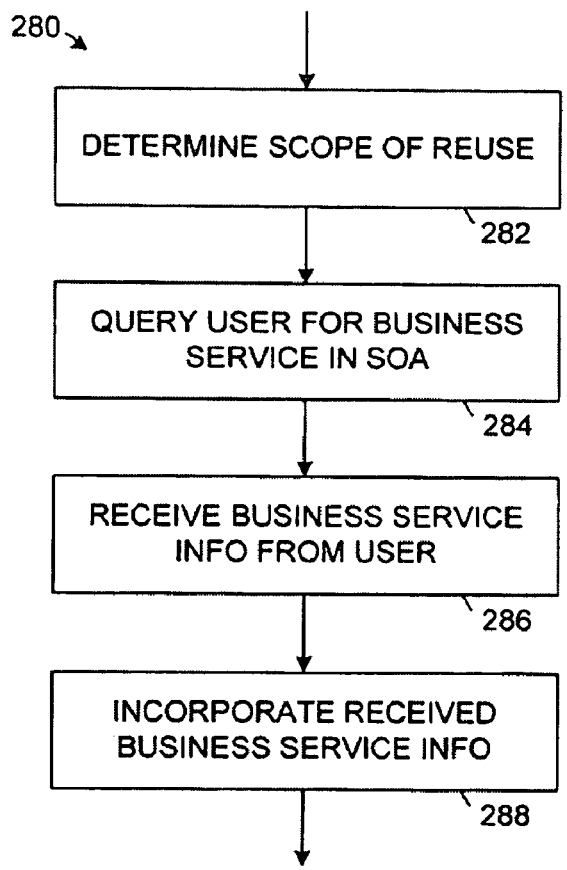
FIG. 2H
FIG. 2I

PROVISIONING ARTIFACTS FOR POLICY ENFORCEMENT OF SERVICE-ORIENTED ARCHITECTURE (SOA) DEPLOYMENTS

CROSS-REFERENCE TO RELATED APPLICATION

This Utility Patent Application is based on and claims the benefit of U.S. Provisional Application No. 61/086,091, filed on Aug. 4, 2008, the contents of which are hereby incorporated by reference in their entirety.

BACKGROUND

Service-Oriented Architecture (SOA) is a computer systems architectural style that creates and uses business processes, packaged as services, throughout the business process lifecycle. SOA defines and provisions an Information Technology (IT) infrastructure to enable different applications to exchange data and participate in business processes, functions that are loosely-coupled with the operating systems and programming languages underlying the applications. SOA separates functions into distinct units (services), which can be distributed over a network and can be combined and reused to create business applications. Services intercommunicate by passing data or by coordinating an activity between two or more services.

SOAs are used to implement information technology (IT) support for business processes that cover present and prospective systems requirements for running a business end-to-end. SOA is a flexible, standardized architecture that improves support for connection of various applications and data sharing, unifying business processes by structuring large applications as an associated collection of smaller modules called services. Applications can be used by different groups both inside and outside of an organization. New applications can be constructed from a mix of services from a global pool enabling greater flexibility and uniformity.

SUMMARY

In various embodiments, a system provisions artifacts for policy enforcement of service-oriented architecture (SOA) deployments. The system comprises a computer-executed program code that creates a model of a SOA deployment by collecting information about SOA artifacts and mapping between business-centric applications and underlying SOA artifacts. The system further comprises a computer-executed program code that converts the model into actionable artifacts which are provisioned to SOA policy enforcement points.

BRIEF DESCRIPTION OF THE DRAWINGS

Embodiments of the invention relating to both structure and method of operation may best be understood by referring to the following description and accompanying drawings:

FIGS. 2A through 2I are flow charts illustrating one or more embodiments or aspects of a computer-executed method for provisioning artifacts for policy enforcement of service-oriented architecture (SOA) deployments.

DETAILED DESCRIPTION

Figure 1:
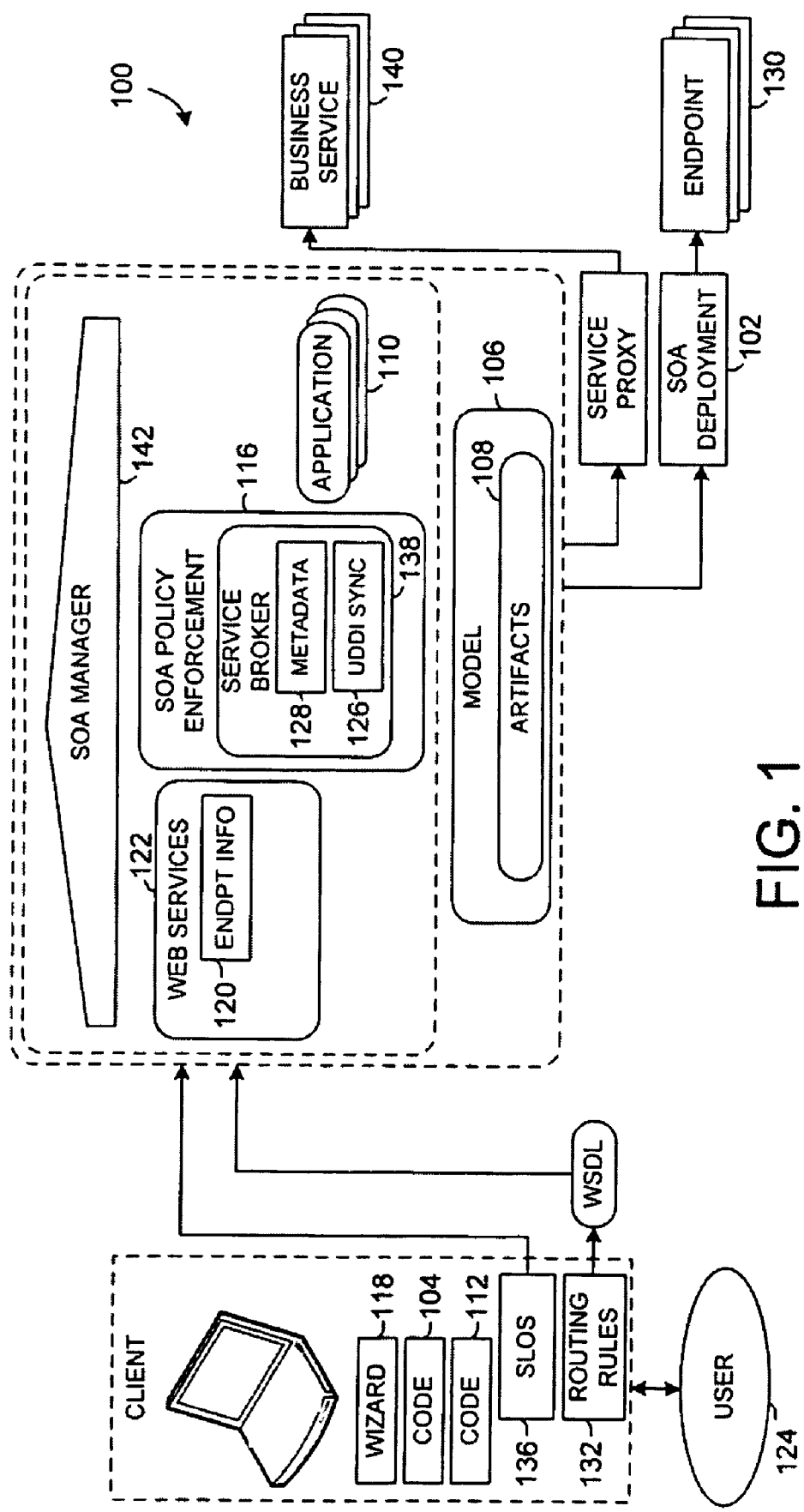
FIG. 1 is a schematic block diagram showing an embodiment of a system that provisions artifacts for policy enforcement of service-oriented architecture (SOA) deployments.

In various system and method embodiments, a model-based technique is configured for collecting, configuring, and provisioning artifacts for usage in policy enforcement of service-oriented architecture (SOA) deployments.

A benefit of using SOA to create applications is that SOA enables reuse of existing services and accelerates building functionality to solve changing business requirements. However services reuse is improved if all dependencies for a particular service are understood. In addition to the understanding of dependencies, performance is improved if the various constraints on using the services are understood. Typically the constraints are encapsulated in contracts and policies. Monitoring the performance of web services can also be performed so that problematic web services are detected and corrected in a timely manner with minimal impact to business applications.

Many applications have certain types of performance and health-related service level objectives (SLOs). Capturing the SLOs enables a user to examine trends, prioritize issues, and react proactively to problems in web services. Policy enforcement points are used in SOA Deployments to actively monitor messages and enforce contracts/policies. Many of the policy enforcement points such as extensible Markup Language (XML) Firewalls and Enterprise Service Bus (ESB) have to be configured individually and are either heavy on performance monitoring or limited to policy enforcement for managing the lifecycle of web services such as content based routing, versioning, message transformation, and the like. Setting up all of the above-mentioned information items for XML Firewall and ESB implementations is usually not obvious to regular users, and is performed using separate tools. Consequently, a user has difficulty understanding the complexities of a given SOA deployment. Since the contracts and policy artifacts to be provisioned are in separate tools, a user typically takes much more time to comprehend all information and correctly capturing the information. Manual configuration of the correct contracts, policies, and SLOs is susceptible to error and most existing tools result in duplicated efforts, resulting in decreased the value of SOA-enabling applications to meet changing business needs.

XML Firewalls provide either no view or a limited view of how web services are reused, and fail to capture reuse information. XML Firewall tools do not give a global view of the relationship between business applications and the web services in use. XML Firewall tools only understand the web services and policies included in the tools, and cannot interoperate without programming changes. Much XML Firewall functionality centers is based around performance monitoring, but has limited SLO monitoring.

Enterprise Service Bus (ESB) provides a limited view or no view of how web services are reused, and reuse information is not captured. ESB tools do not give a global view of the relationship between business applications and the web services in use. ESB tools have policies for lifecycle management and performance monitoring, and integrate with other operations tools such as OpenView Operations (OVO) to provide SLO monitoring, resulting in duplicated information across tools.

SOA Manager 2.1 manages the configuration of policies and SLO in separate applications, and creates relationships between applications and web services, but does not enable capture of policy/contract-related information. Information has to be entered separately in Broker and business service explorer tools.

The system and associated methods depicted herein enable a model-based approach to collect information about SOA artifacts, for example Web services, to create mapping between high level business-centric applications and underlying SOA artifacts. The model also captures information to configure policies that enable lifecycle management of Web Services and performance monitoring of Web Services. The model is then converted into actionable artifacts that are provisioned to SOA policy enforcement points which are responsible for enforcing policies and collecting performance and health metrics.

In the model-based approach, collecting, configuring, and provisioning of artifacts are derived in whole or in part from a model that describes some aspects of the system, typically functional aspects.

The illustrative system and associated techniques create relationships between business applications and the web services in use and show the relationship in a single pane of information, enabling understanding of policies in a manner that is independent of the platform upon which the system operates. The depicted system and techniques enable understanding of policies in platforms including, for example, SOA Manager Broker, XML Firewalls, and Enterprise Service Bus, and captures the policy-related information for the web services to define and enforce the policies in runtime. The described system and techniques enable understanding of the metrics supported by each policy enforcement type, monitoring, and setting of service level objectives (SLOs), and enables the user to clearly identify and define information relating to web services under management in SOA deployments. The policies are distributed from a central location, for example after translation into policy instances that can be understood by a policy enforcement point.

The illustrative system and technique for collecting, configuring, and provisioning artifacts for policy enforcement of SOA deployments enables users to attain a board level understanding of not only all the web services but also relationships among the web services, health/performance information and policies associated with the web services, thereby facilitating reused.

Referring to FIG. 1, a schematic block diagram illustrates an embodiment of a system 100 that provisions artifacts for policy enforcement of service-oriented architecture (SOA) deployments 102. The system 100 comprises a computer-executed program code 104 that creates a model 106 of a SOA deployment 102 by collecting information about SOA artifacts 108 and mapping between business-centric applications 110 and underlying SOA artifacts 108. The system 100 further comprises a computer-executed program code 112 that converts the model 106 into actionable artifacts 108 that are provisioned to SOA policy enforcement points 116.

The system 100 can further comprise a graphical user interface (GUI) wizard 118 that sets endpoint information 120 for the web services 122 to be brought under management as directed by a user 124, sets type of Policy Enforcement Point 116 for usage in the SOA deployment 102, and interrogates policy types that are supported by a selected Policy Enforcement Point 116.

In some implementations, the graphical user interface (GUI) wizard 118 sets Policy Enforcement Point instances 116 to which policies and provisioning artifacts 108 are accumulated as directed by the user 124. The GUI wizard 118 can also configure Universal Description, Discovery, and Integration (UDDI) synchronization information 126 using configuration metadata 128 to determine fields for inclusion for correct access location information. UDDI is a platform-independent, XML-based registry for listing businesses world-wide on the Internet, enabling businesses to publish service listings, discover one another, and define how services or software applications interact over the Internet.

The graphical user interface (GUI) wizard 118 can also be configured to determine policy instances corresponding to the policy types based on the metadata 128, and selects policies and defines contracts to be enforced at runtime by the Policy Enforcement Point 116 as directed by a user 124.

The graphical user interface (GUI) wizard 118 can be configured to classify endpoints 130 by identifying policies for which additional configuration is warranted for runtime enforceability based on metadata 128, incorporating additional configuration information as directed by the user 124.

In some applications, a graphical user interface (GUI) wizard 118 can operate to configure load balancing policies by accessing metadata 128 and the endpoint information 120, and determining whether definition of additional routing rules is warranted based on the endpoint information and metadata. The GUI wizard 118 determines configuration parameters for defining routing rules 132 by manual entry or extracting information from Web Services Descriptive Language (WSDL) 134, and sets configuration parameter information as directed by the user 124.

Some embodiments of the graphical user interface (GUI) wizard 118 can be configured to manage service level objectives (SLOs) 136. The wizard 118 specifies SLOs 136 by accessing metadata 128 based on type of Broker 138 whereby a Broker 138 registers metadata 128 defining support in terms of policies and SLOs 136, determining defaults based on type of service and metadata, and specifying SLOs 136 for generating alerts as directed by a user 124. The Broker 138 is part of the Policy Enforcement Points 116.

The graphical user interface (GUI) wizard 118 can also be configured to determine a scope of reuse by selecting a business service 140 that exists in a service-oriented architecture (SOA) manager 142 or addition of a new business service 140 as directed by a user 124.

Figure 2C:
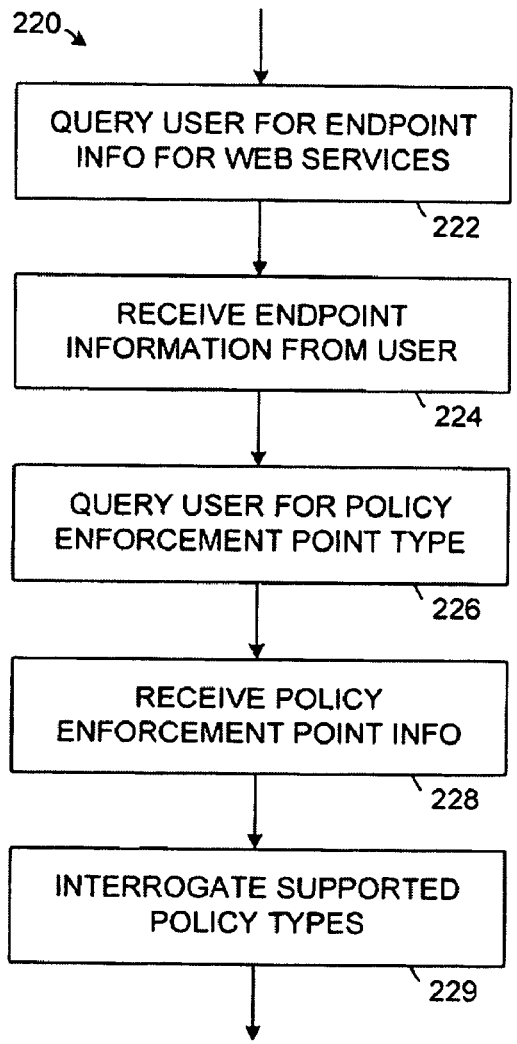

Referring to FIGS. 2A through 2I, flow charts illustrate one or more embodiments or aspects of a computer-executed method 200 for provisioning artifacts for policy enforcement of service-oriented architecture (SOA) deployments. FIG. 2A depicts the computer-executed method 200 comprises creating 202 a model of a SOA deployment and converting 204 the model into actionable artifacts. Creating 202 the model of SOA deployment comprises collecting 206 information about SOA artifacts, and creating 208 a mapping between business-centric applications and underlying SOA artifacts. The model is converted 204 into actionable artifacts that are provisioned to SOA policy enforcement points.

Referring to FIG. 2B, various aspects of a computer-executed method 210 for provisioning artifacts comprises distributing 211 policies according to the SOA policy enforcement points and collecting 212 performance and health metrics according to the SOA policy enforcement points.

In some implementations, the method 210 can further comprise collecting 214 SOA artifact information that enables lifecycle management of Web Services and performance monitoring of the Web Services.

In some embodiments, the method 210 can further comprise creating 215 a relationship between operating business services and web services, and displaying 216 the relationship in a single screen.

In another aspect, the method 210 can comprise analyzing 217 policies independently of platform and capturing 218 policy-related information for web services whereby policy definition and enforcement is in run-time.

Referring to FIG. 2C, an embodiment of a computer-executed method for operating 220 a wizard in a user interface comprises querying 222 a user for endpoint information for the web services to be brought under management and receiving 224 the endpoint information from the user. The method 220 further comprises querying 226 the user for a type of policy enforcement point for usage in the SOA deployment, and receiving 228 the policy enforcement point type from the user. Policy types are interrogated 229 that are supported by a selected policy enforcement point.

Figure 2D:
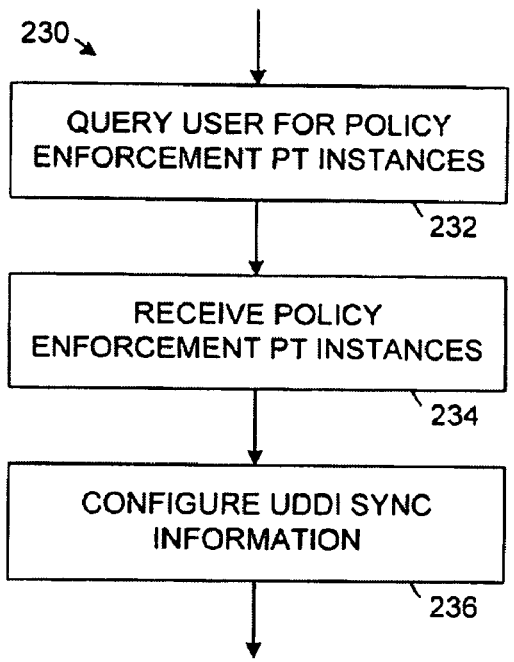

Referring to FIG. 2D, an embodiment of a method for operating 230 the wizard in a user interface comprises querying 232 the user for policy enforcement point instances to which policies and provisioning artifacts accumulated, and receiving 234 the policy enforcement point instances from the user. Universal Description, Discovery, and Integration (UDDI) synchronization information is configured 236 using configuration metadata to determine fields for inclusion for correct access location information.

Figure 2E:
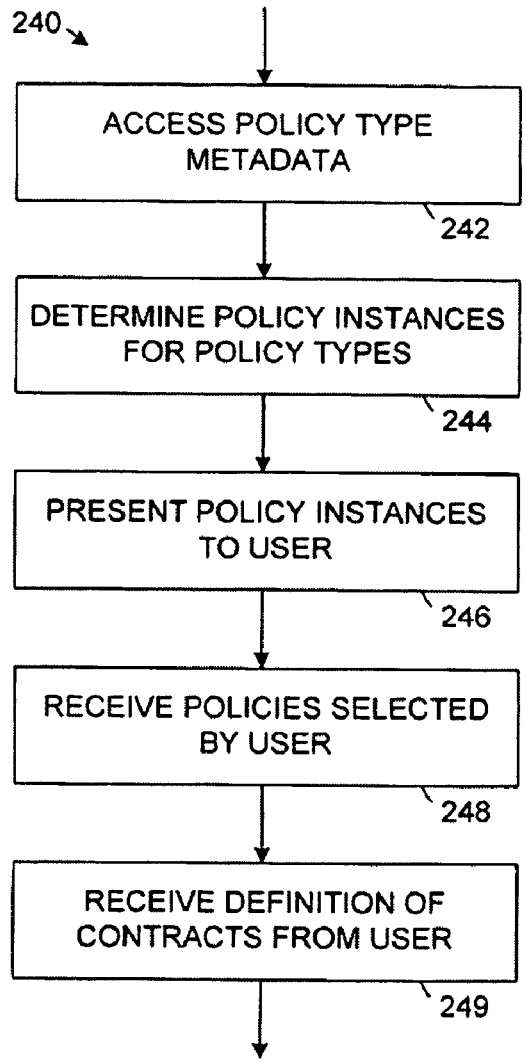

Referring to FIG. 2E, an embodiment of a method for operating 240 the wizard in a user interface comprises accessing 242 metadata of policy types, determining 244 policy instances corresponding to the policy types based on the metadata, and presenting 246 the policy instances to the user. Selected policies are received 248 from the user, and a definition of contracts to be enforced at runtime by the policy enforcement point is received 249 from the user.

Figure 2F:
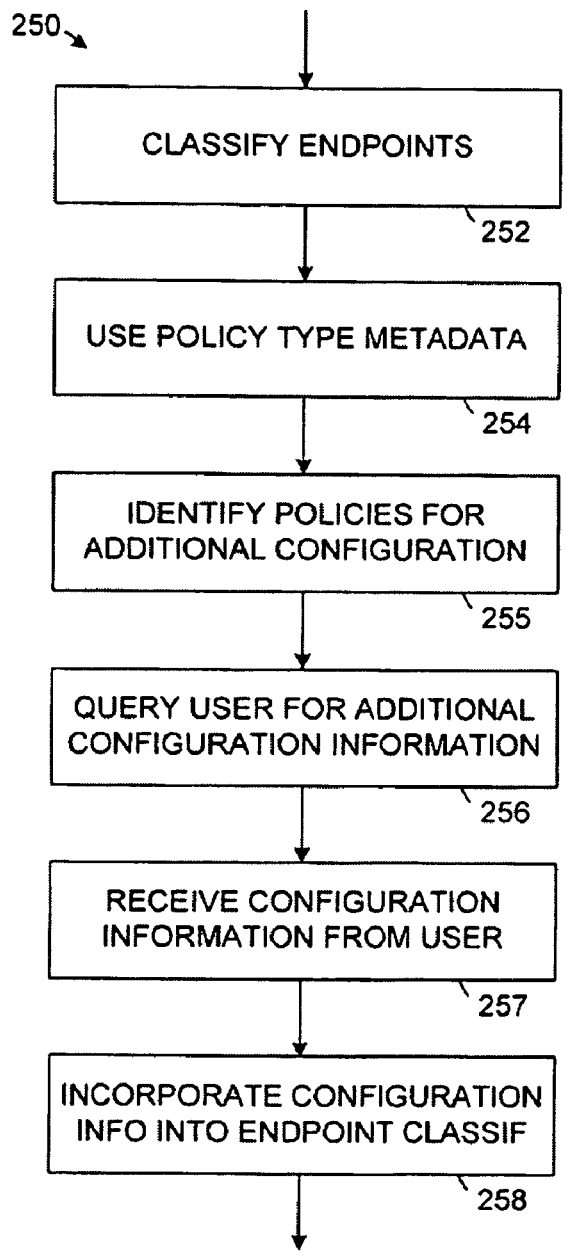

Referring to FIG. 2F, an embodiment of a method for operating 250 the wizard in a user interface comprises enabling 252 classification of endpoints, for example changing service name, creating aliases, and the like. Policy type meta-data is used 254 to identify 255 policies for which additional configuration is warranted for runtime enforceability based on the meta data. The user is queried 256 for information relating to the additional configuration, the additional configuration information is received 257 from the user, and the received configuration information is incorporated 258 into the endpoint classification.

Figure 2G:
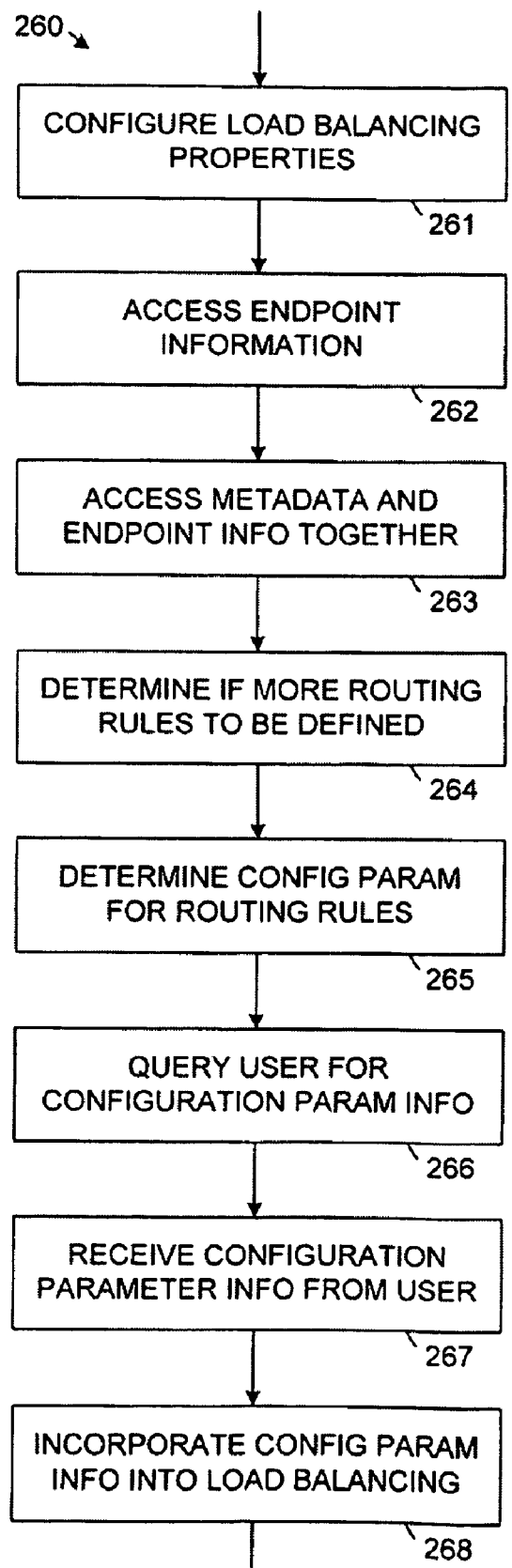

Referring to FIG. 2G, an embodiment of a method for operating 260 the wizard in a user interface comprises configuring 261 load balancing policies. Load balancing policies can be configured 261 by accessing 262 the endpoint information, accessing 263 metadata in combination with the endpoint information, and determining 264 whether definition of additional routing rules is warranted based on the endpoint information and metadata. Configuration parameters are determined 265 for defining routing rules when definition of additional routing rules is warranted. The user is queried 266 for information relating to the determined configuration parameters, and the configuration parameter information is received 267 from the user. The received configuration parameter information is incorporated 268 into load balancing policies.

Referring to FIG. 2H, an embodiment of a method for operating 270 the wizard in a user interface comprises specifying 272 service level objectives (SLOs). SLOs can be specified 272 by accessing 273 metadata based on type of Policy Enforcement Point or Broker whereby a Broker registers meta data defining support in terms of policies and service level objectives, and determining 274 defaults based on type of service and meta data. The user is queried 276 regarding specification of SLOs for generating alerts, and the SLO information is received 277 from the user. The received SLO information is incorporated 278 into the SLO specification.

Referring to FIG. 2I, an embodiment of a method for operating 280 the wizard in a user interface comprises determining 282 scope of reuse. Scope of reuse can be determined 282 by querying 284 the user regarding selection of a business service that exists in a service-oriented architecture (SOA) manager or addition of a new business service, receiving 286 business service information from the user, and incorporating 288 the received business service information.

Referring to FIGS. 3A through 3G, a series of screen shots for an embodiment of a wizard for implementing a model-based technique for collecting, configuring; and provisioning artifacts for policy enforcement of SOA deployments. The system and associate technique can be implemented as a seven-step wizard 300 in a user interface with a model-driven architecture driving the user interface.

Figure 3A:
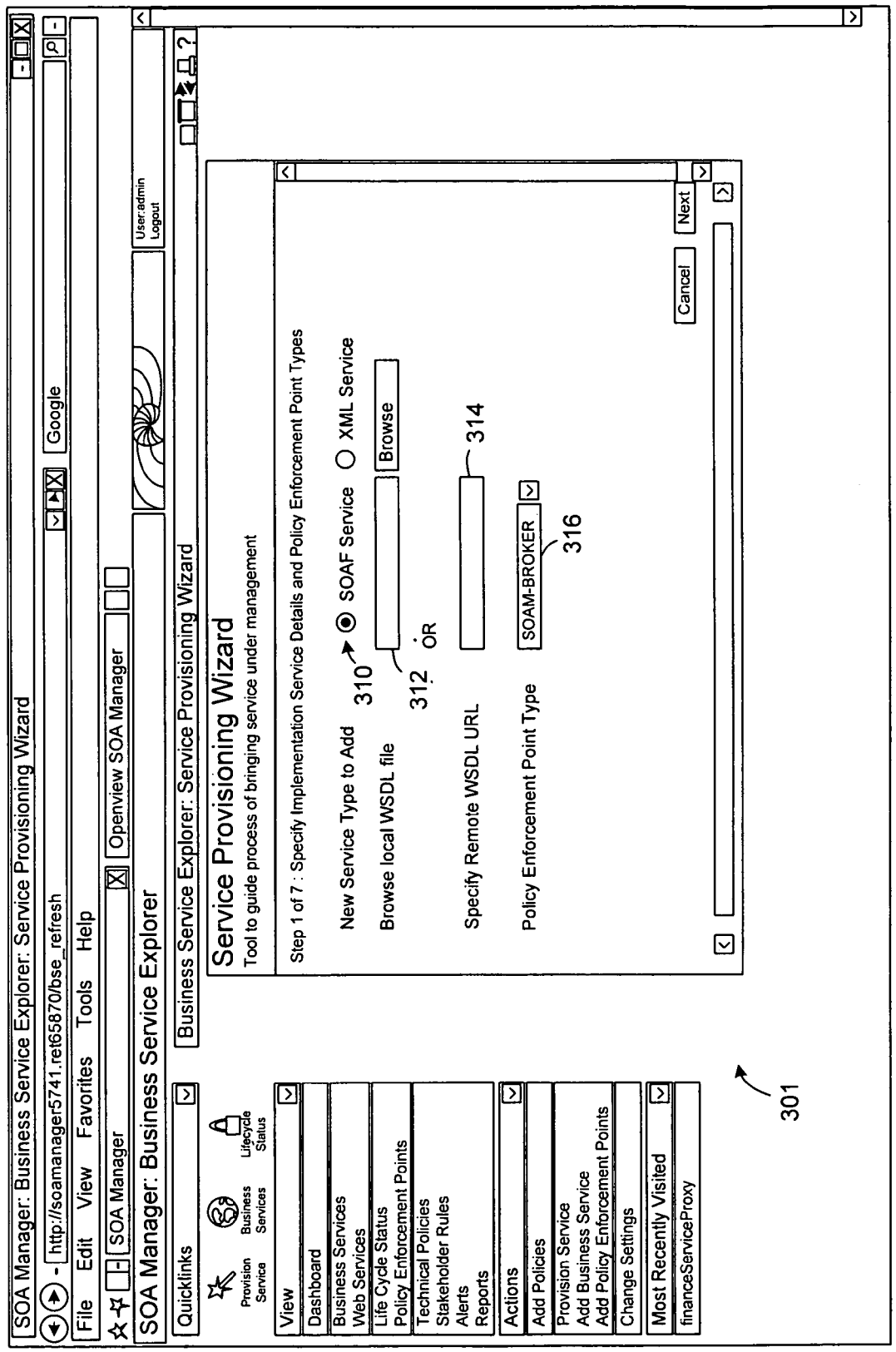
FIGS. 3A through 3H are a series of screen shots for an embodiment of a wizard for implementing a model-based technique for collecting, configuring, and provisioning artifacts for policy enforcement of SOA deployments.

Referring to FIG. 3A, a screen shot depicts a first screen 301 corresponding to a first step in wizard operation. The first screen 301 enables a user to specify Web Services Descriptive Language (WSDL) and policy enforcement point types. A selector 310 enables the user to select a new service type to be added, for example from a SOAP service and an XML service. The first screen enables the user to supply service contract and endpoint information for the web services to be brought under management, for example using a control 312 that enables browsing for a local WSDL file, or a control 314 enabling the user to specify a remote WSDL Uniform Resource Locator (URL). A control 316 enables the user to select a policy enforcement point type. The first screen 301 enables the user to supply endpoint information by specifying a WSDL or an actual endpoint location if no WSDL exists. The user specifies the type of policy enforcement point to be used in the SOA deployment. Depending on the type of the policy enforcement point, for example SOA Manager Broker, XML Firewall, ESB, or the like, the application interrogates the policy types that are supported by the selected policy enforcement point.

Figure 3B:
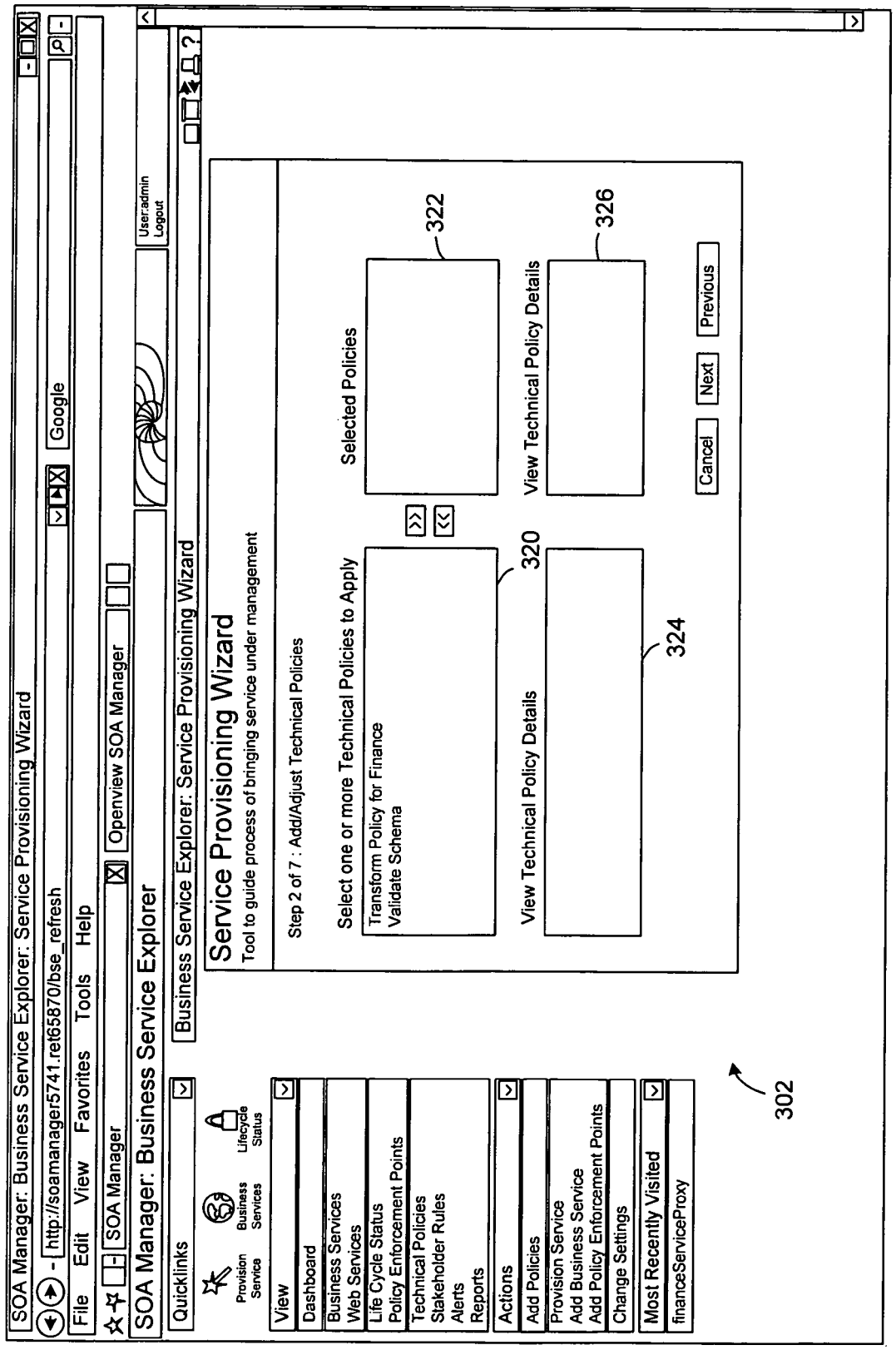

Referring to FIG. 3B, a screen shot depicts a second screen 302 corresponding to a second step in wizard operation. The second screen 302 enables a user to select policies, for example enabling addition and/or adjustment of technical policies. A control 320 enables the user to select one or more technical policies for application, and a display 322 lists selected policies. A display 324 enables the user to view technical policy details of policies which can be selected by the control 320. A display 326 shows technical policy details of policies that are selected. Based on the metadata of the policy types, the policy instances corresponding to the policy types are presented to the user. The user can select the policies and define the contracts to be enforced at runtime by the policy enforcement point.

Figure 3C:
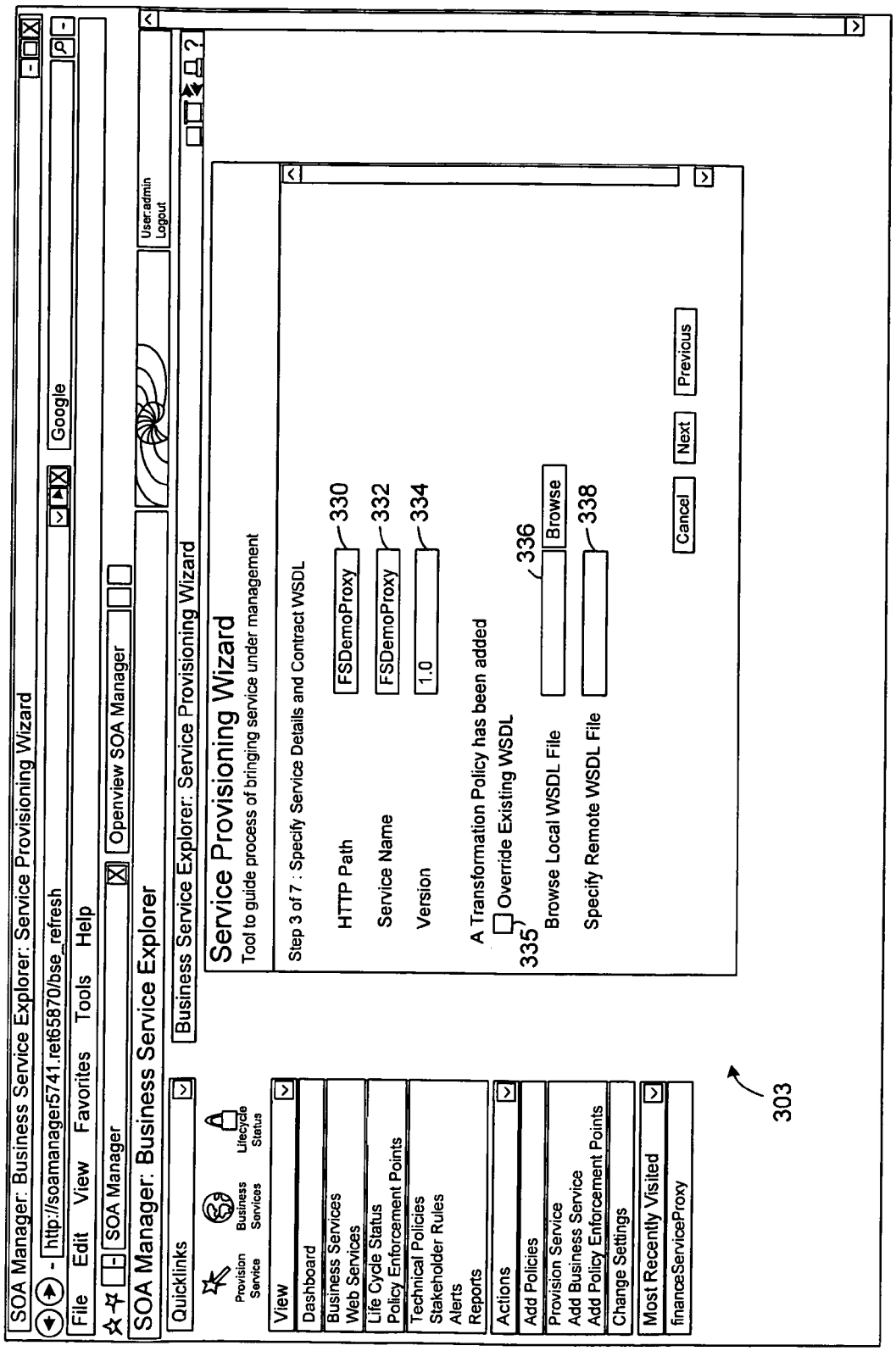

Referring to FIG. 3C, a screen shot depicts a third screen 303 corresponding to a third step in wizard operation. The third screen 303 enables a user to set service details. In an example implementation, the third screen 303 enables the user to specify service details and contract WSDL by use of a control 330 for selecting an HTTP path, a control 332 for entering a service name, and a control 334 for selecting a version. A control 335 allows the user to override existing WSDL, if desired. The user can select the contract WSDL, for example using a control 336 that enables browsing for a local WSDL file, or a control 338 enabling the user to specify a remote WSDL file. The third screen 303 enables the user to define proxy service information, for example changing service name, create aliases, and the like. Also the policy type metadata is used to identify policies that warrant additional configuration. Policy types that depend on endpoint information and message content can be made enforceable at runtime by use of additional parameters. For example, if a transformation policy is selected then the user can specify the WSDL that the customer can use so that transparent versioning of web services can be done.

Figure 3D:
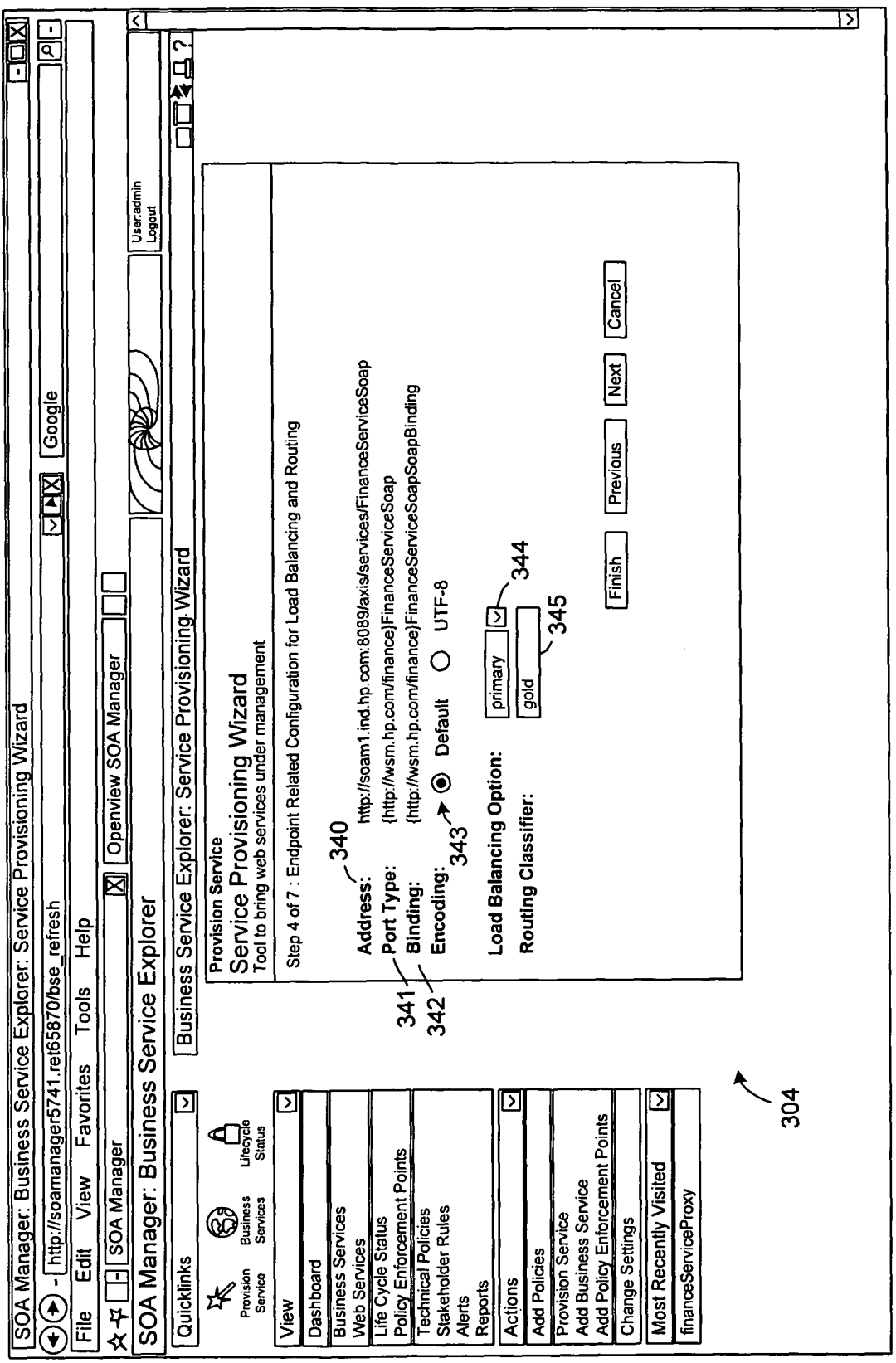
Figure 3E:
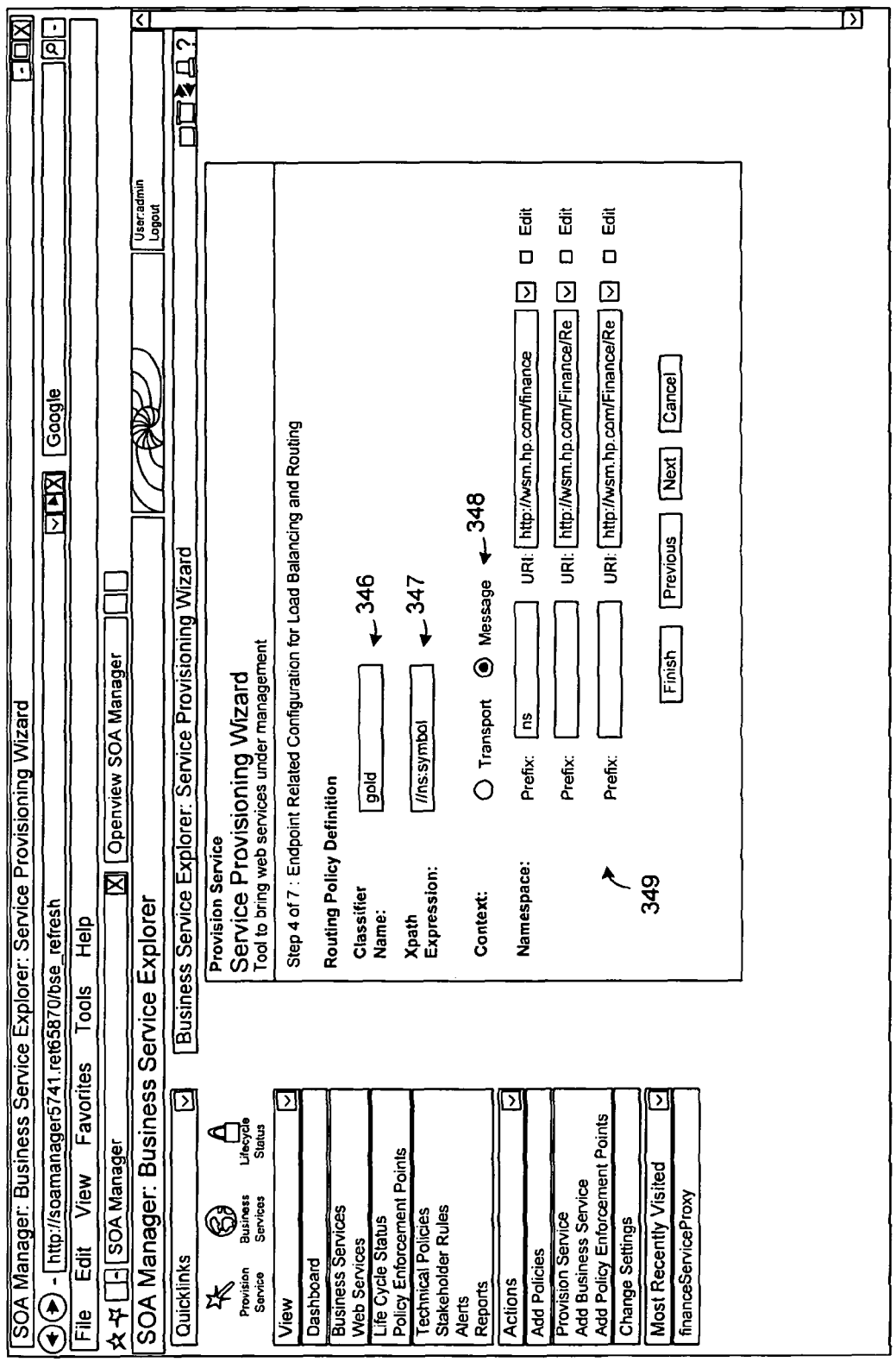

Referring to FIG. 3D, a screen shot depicts a fourth screen 304 corresponding to a fourth step in wizard operation. The fourth screen 304 enables a user to set an endpoint related configuration for load balancing and routing. The user can set an address 340, port type 341, and binding 342. Buttons 343 enable the user to select encoding between default and UTF-8 settings. The user can also use a drop-down list 344 to set a load balancing option. The user can also set a routing classifier 345. FIG. 3E illustrates a screen which is accessed from the fourth screen 304 and enables the user to define a routing policy. The user can enter a classifier name 346 and Xpath expression 347. Buttons 348 are used to enable the user to select context from between transport and message contexts. The screen further includes a namespace table 349 enabling the user to define the namespace.

Figure 3F:
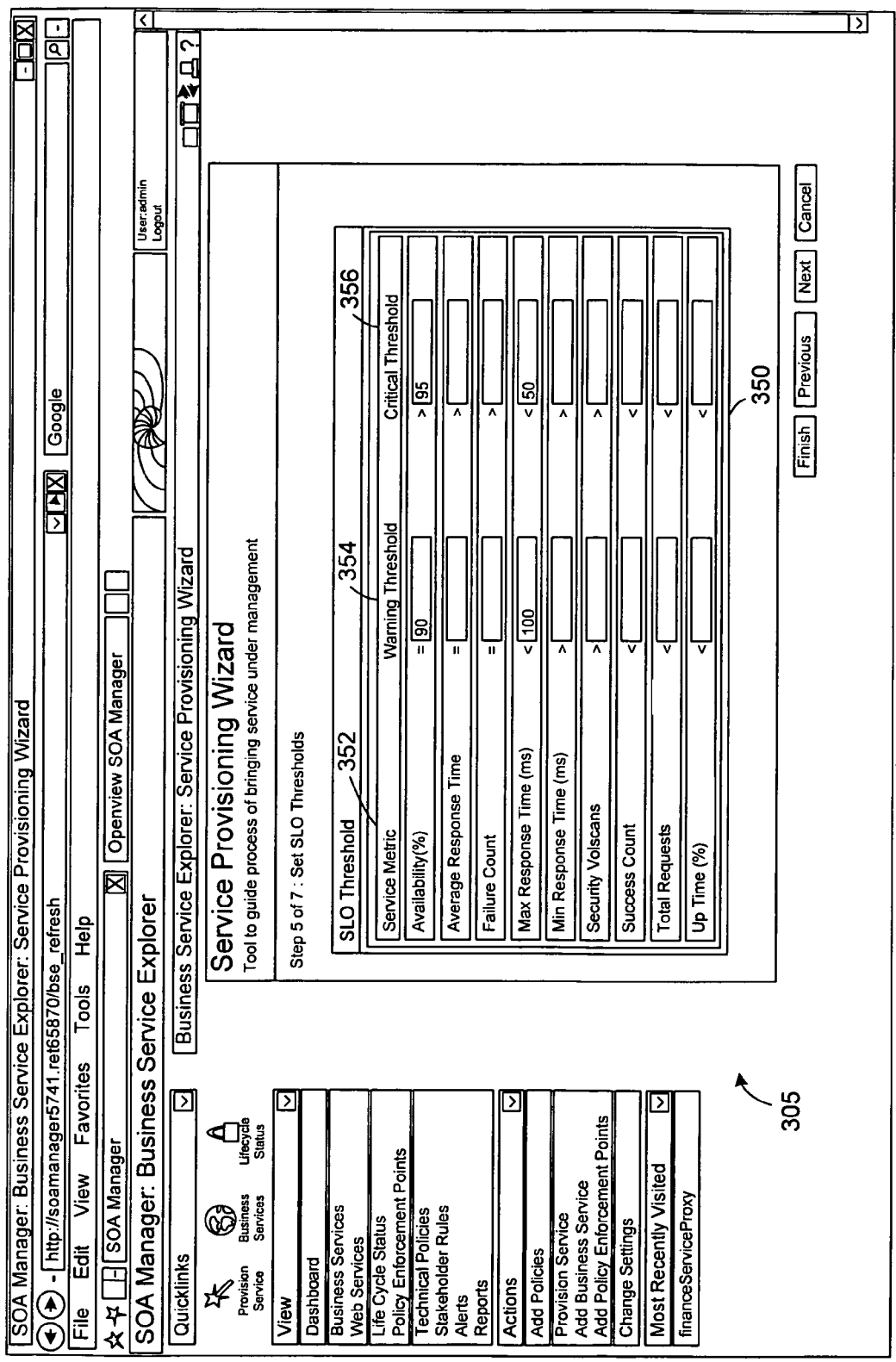

Referring to FIG. 3F, a screen shot depicts a fifth screen 305 corresponding to a fifth step in wizard operation. The fifth screen 305 enables a user to set service level objectives. In an example embodiment, the fifth screen 305 can include a table 350 for entering service level objective (SLO) thresholds. The table 350 includes a list 352 of service metrics, enterable warning thresholds 354, and critical thresholds 356. The user can use the table 350 to specify SLOs for generating alerts. The table information can also be metadata driven based on the type of Policy Enforcement Point or Broker and eventually provides defaults depending on the type of service that is provisioned.

Figure 3G:
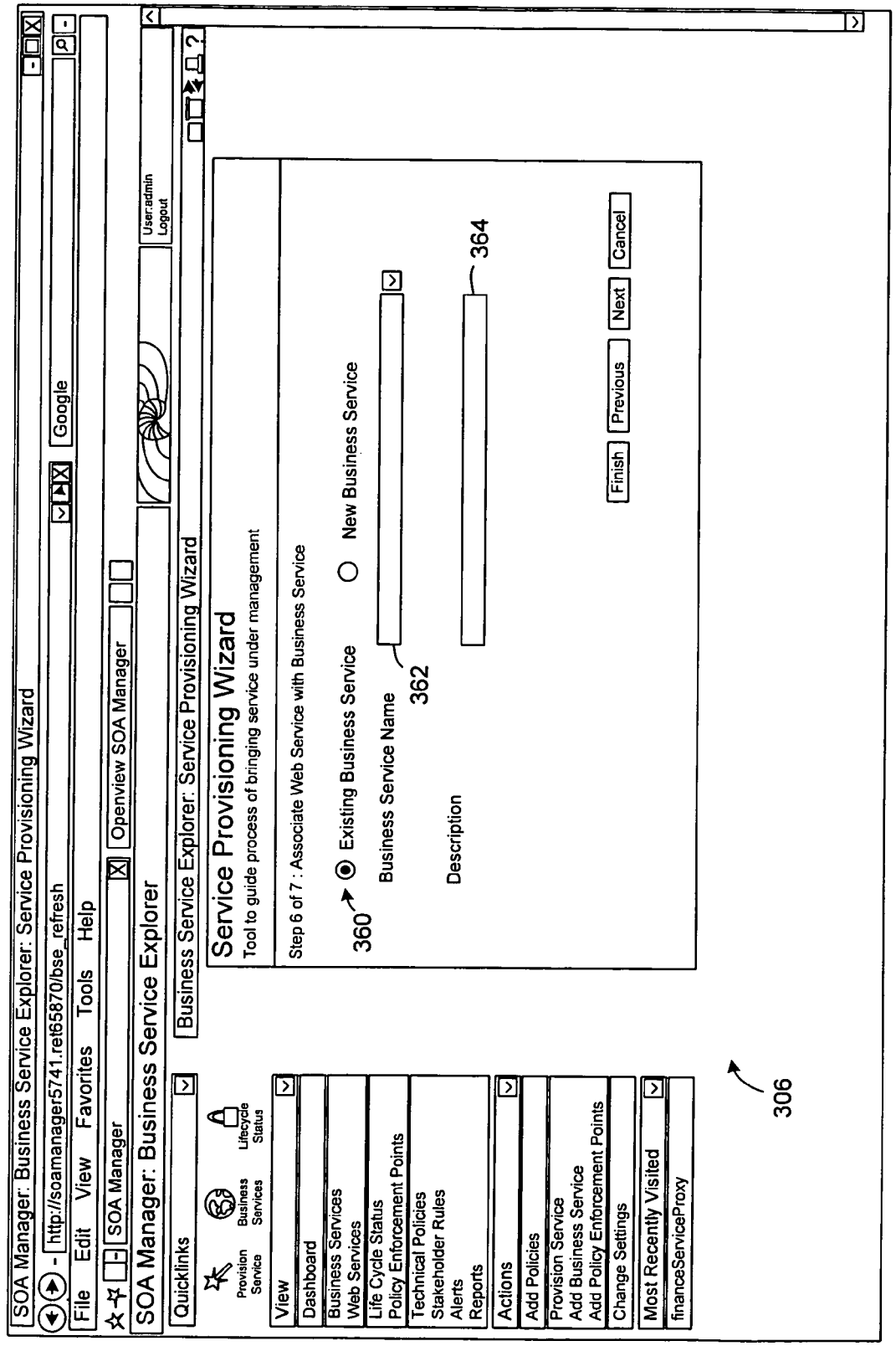

Referring to FIG. 3G, a screen shot depicts a sixth screen 306 corresponding to a sixth step in wizard operation. The sixth screen 306 enables a user to set a business service name. A selector 360 enables the user to select between a new business service and an existing business service. The sixth screen enables the user to set the business service, for example using a control 362 that enables entry of a business service name and a control 364 that enables entry of a description. To enable understanding of the scope of reuse, the user can either select an existing business service that exists in the SOA Manager, specifically a SOA dependency map that already exists, or add new business service.

Figure 3H:
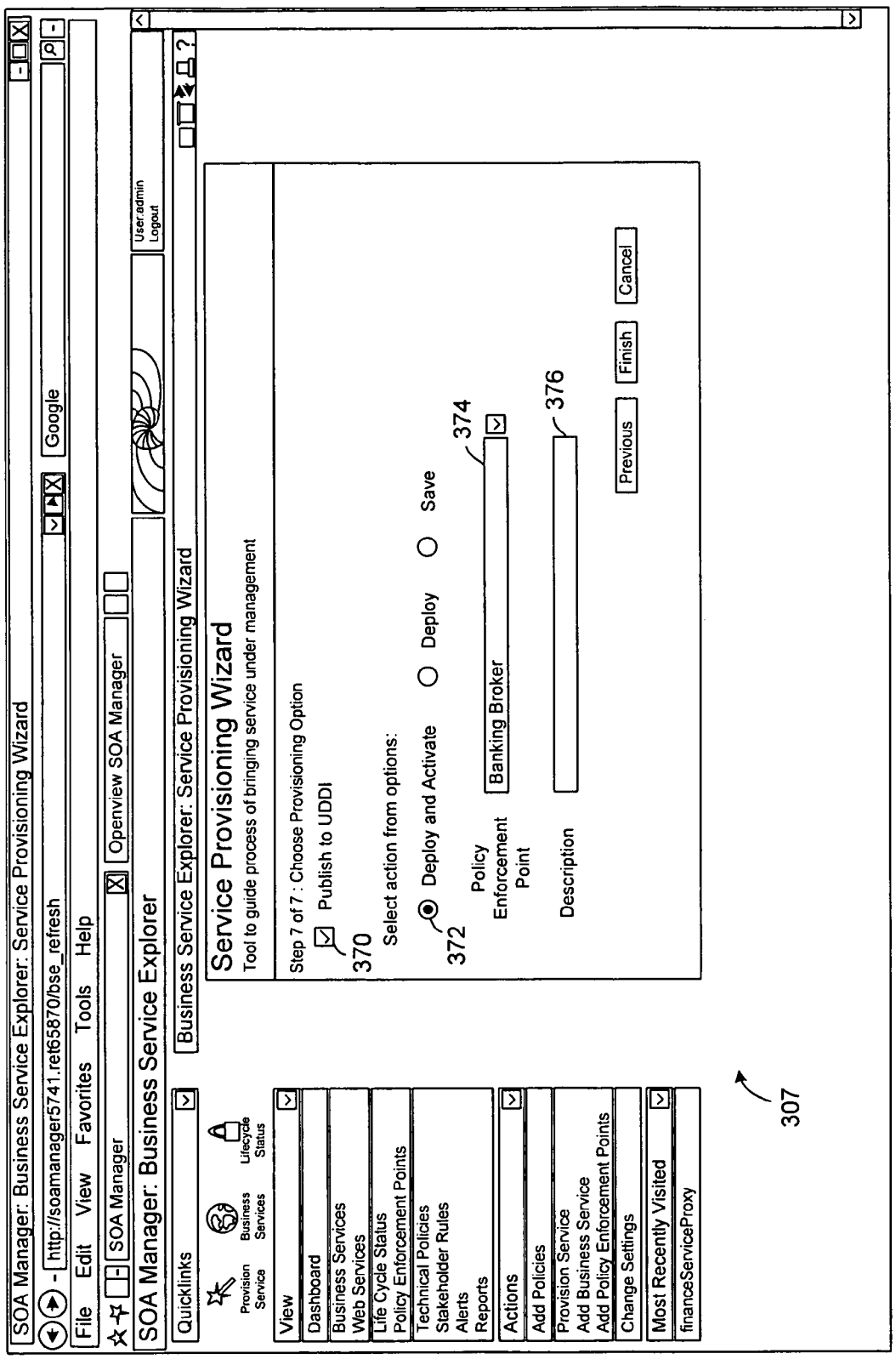

Referring to FIG. 3H, a screen shot depicts a seventh screen 307 corresponding to a seventh step in wizard operation. The seventh screen 307 enables a user to set a policy enforcement instance. A selector 370 enables the user to choose a provisioning option, publish to the UDDI option. A selector 372 enables a user to select among options of deploy and activate, deploy alone, or save. A control 374 enables the user to select a policy enforcement point. A control 376 enables the user to view the description. Using the seventh screen 307, the user specifies the policy enforcement point instances to which the policies and other provisioning artifacts are "pushed" centrally. The seventh screen 307 also enables the user to configure any UDDI synchronization information. Other configuration metadata can be used to understand which fields are sufficient so that the access location information can be published correctly.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller for provisioning artifacts for policy enforcement of service-oriented architecture (SOA) deployments.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-executed method for provisioning artifacts for policy enforcement of service-oriented architecture (SOA) deployments comprising:
   creating a model of a SOA deployment comprising:
      collecting information about SOA artifacts; and
      creating a mapping between business-centric applications and underlying SOA artifacts; and
   converting the model into actionable artifacts that are provisioned to SOA policy enforcement points.

2. The method according to claim 1 further comprising:
   enforcing policies according to the SOA policy enforcement points; and
   collecting performance and health metrics according to the SOA policy enforcement points.

3. The method according to claim 1 further comprising:
   collecting SOA artifact information that enables lifecycle management of Web Services and performance monitoring of the Web Services.

4. The method according to claim 1 further comprising:
   operating a wizard in a user interface comprising:
      querying a user for endpoint information for the web services to be brought under management;
      receiving the endpoint information from the user;
      querying the user for a type of policy enforcement point for usage in the SOA deployment;
      receiving the policy enforcement point type from the user; and
      interrogating policy types that are supported by a selected policy enforcement point.

5. The method according to claim 4 further comprising:
operating the wizard in a user interface comprising:
    querying the user for policy enforcement point instances to which policies and provisioning artifacts accumulated;
    receiving the policy enforcement point instances from the user;
    configuring Universal Description, Discovery, and Integration (UDDI) synchronization information using configuration metadata to determine fields for inclusion for correct access location information.

6. The method according to claim 4 further comprising:
operating the wizard in a user interface comprising:
    accessing metadata of policy types;
    determining policy instances corresponding to the policy types based on the metadata;
    presenting the policy instances to the user;
    receiving selected policies from the user; and
    receiving from the user a definition of contracts to be enforced at runtime by the policy enforcement point.

7. The method according to claim 4 further comprising:
operating the wizard in a user interface comprising:
    classifying endpoints comprising:
        accessing metadata of policy types;
        identifying policies for which additional configuration is warranted for runtime enforceability based on the metadata;
        querying the user for information relating to the additional configuration;
        receiving the additional configuration information from the user; and
        incorporating the received configuration information.

8. The method according to claim 4 further comprising:
operating the wizard in a user interface comprising:
    configuring load balancing policies comprising:
        accessing the endpoint information;
        accessing metadata in combination with the endpoint information;
        determining whether definition of additional routing rules is warranted based on the endpoint information and metadata;
        determining configuration parameters for defining routing rules when definition of additional routing rules is warranted;
        querying the user relating to the determined configuration parameters;
        receiving configuration parameter information from the user; and
        incorporating the received configuration parameter information.

9. The method according to claim 4 further comprising:
operating the wizard in a user interface comprising:
    specifying service level objectives (SLOs) comprising:
        accessing metadata based on type of broker whereby a broker registers metadata defining support in terms of policies and service level objectives;
        determining defaults based on type of service and metadata;
        querying the user regarding specification of SLOs for generating alerts;
        receiving SLO information from the user; and
        incorporating the received SLO information.

10. The method according to claim 4 further comprising:
operating the wizard in a user interface comprising:
    determining scope of reuse comprising:
        querying the user regarding selection of a business service that exists in a service-oriented architecture (SOA) manager or addition of a new business service;
        receiving business service information from the user; and
        incorporating the received business service information.

11. The method according to claim 1 further comprising:
creating a relationship between operating business services and web services; and
displaying the relationship in a single display.

12. The method according to claim 1 further comprising:
analyzing policies independently of platform; and
capturing policy-related information for web services whereby policy definition and enforcement is in runtime.

13. A system that provisions artifacts for policy enforcement of service-oriented architecture (SOA) deployments comprising:
    a computer-executed program code that creates a model of a SOA deployment by collecting information about SOA artifacts and mapping between business-centric applications and underlying SOA artifacts; and
    a computer-executed program code that converts the model into actionable artifacts that are provisioned to SOA policy enforcement points.

14. The system according to claim 13 further comprising:
a graphical user interface (GUI) wizard that sets endpoint information for the web services to be brought under management as directed by a user, sets type of policy enforcement point for usage in the SOA deployment, and interrogates policy types that are supported by a selected policy enforcement point.

15. The system according to claim 13 further comprising:
a graphical user interface (GUI) wizard that sets policy enforcement point instances to which policies and provisioning artifacts accumulated as directed by a user, and configures Universal Description, Discovery, and Integration (UDDI) synchronization information using configuration metadata to determine fields for inclusion for correct access location information.

16. The system according to claim 13 further comprising:
a graphical user interface (GUI) wizard that determines policy instances corresponding to the policy types based on the metadata, and selects policies and defines contracts to be enforced at runtime by the policy enforcement point as directed by a user.

17. The system according to claim 13 further comprising:
a graphical user interface (GUI) wizard that classifies endpoints by identifying policies for which additional configuration is warranted for runtime enforceability based on metadata, incorporating additional configuration information as directed by a user.

18. The system according to claim 13 further comprising:
a graphical user interface (GUI) wizard that configures load balancing policies by accessing metadata and the endpoint information, determining whether definition of additional routing rules is warranted based on the endpoint information and metadata, determining configuration parameters for defining routing rules by manual entry or extracting information from Web Services Descriptive Language (WSDL), and sets configuration parameter Information as directed by a user.

19. The system according to claim 13 further comprising:
a graphical user interface (GUI) wizard that specifies service level objectives (SLOs) by accessing metadata based on type of broker whereby a broker registers metadata defining support in terms of policies and service level objectives, determining defaults based on type of service and metadata, and specifying SLOs for generating alerts as directed by a user.

20. The system according to claim 13 further comprising:
a graphical user interface (GUI) wizard that determines scope of reuse by selecting a business service that exists in a service-oriented architecture (SOA) manager or addition of a new business service as directed by a user.

21. An article of manufacture comprising:
a controller-usable medium having a computer readable program code embodied in a controller for provisioning artifacts for policy enforcement of service-oriented architecture (SOA) deployments, the computer readable program code further comprising:

code causing the controller to create a model of a SOA deployment;

code causing the controller to collect information about SOA artifacts;

code causing the controller to create a mapping between business-centric applications and underlying SOA artifacts; and code causing the controller to convert the model into actionable artifacts that are provisioned to SOA policy enforcement points.

* * * * *